Figure 1:
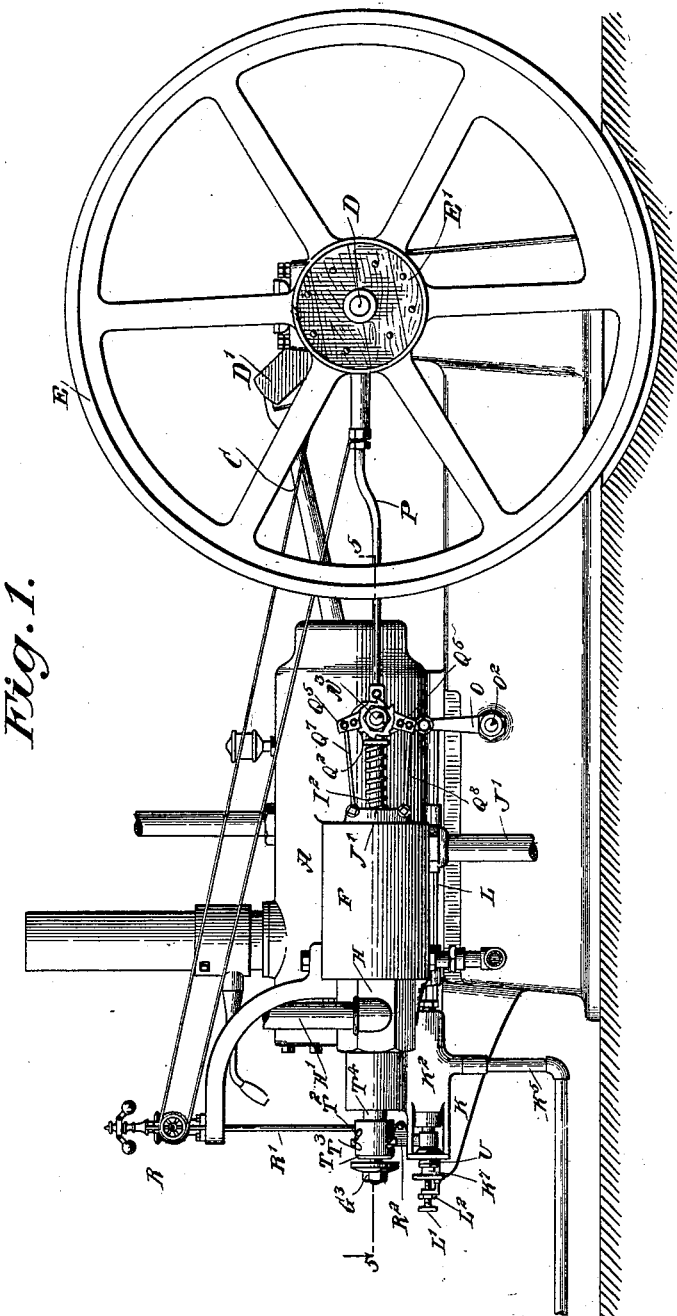

No. 665,714. Patented Jan. 8, 1901.
A. L. ZIMMERMAN.
SPEED REGULATOR FOR EXPLOSIVE ENGINES.
(Application filed July 29, 1899.)
(No Model.) 3 Sheets—Sheet 1.

WITNESSES:

INVENTOR

ATTORNEYS

No. 665,714. Patented Jan. 8, 1901.
A. L. ZIMMERMAN.
SPEED REGULATOR FOR EXPLOSIVE ENGINES.
(Application filed July 29, 1899.)
(No Model.) 3 Sheets—Sheet 2.
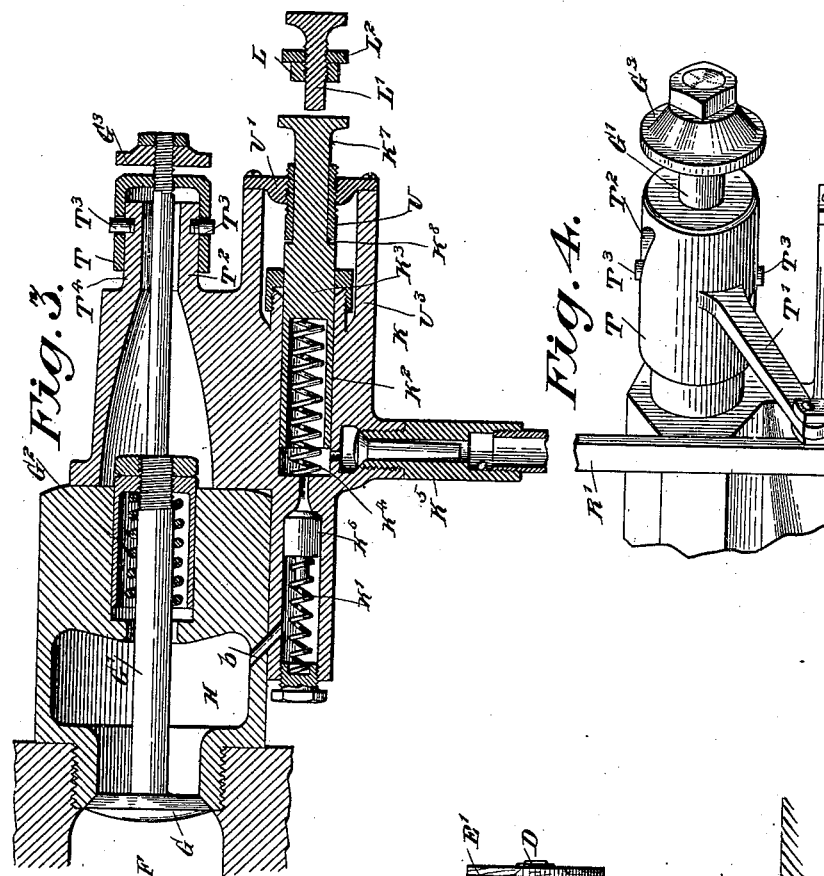
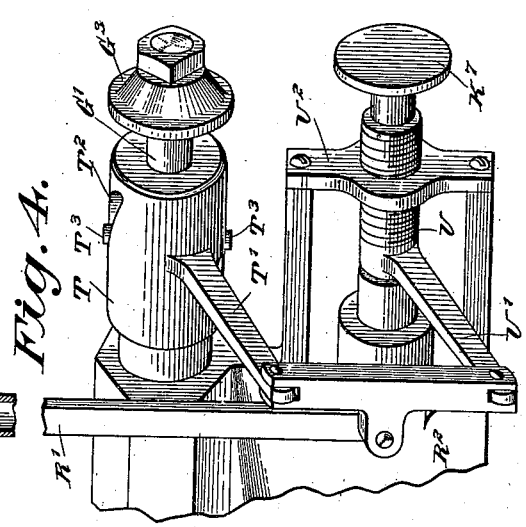
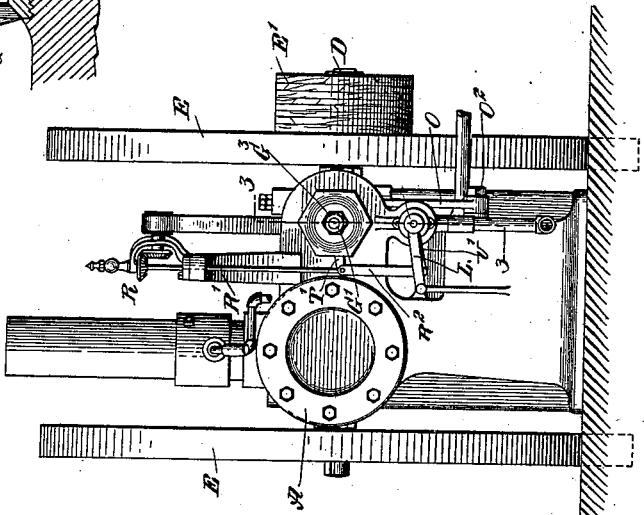
WITNESSES:
INVENTOR
BY
ATTORNEYS

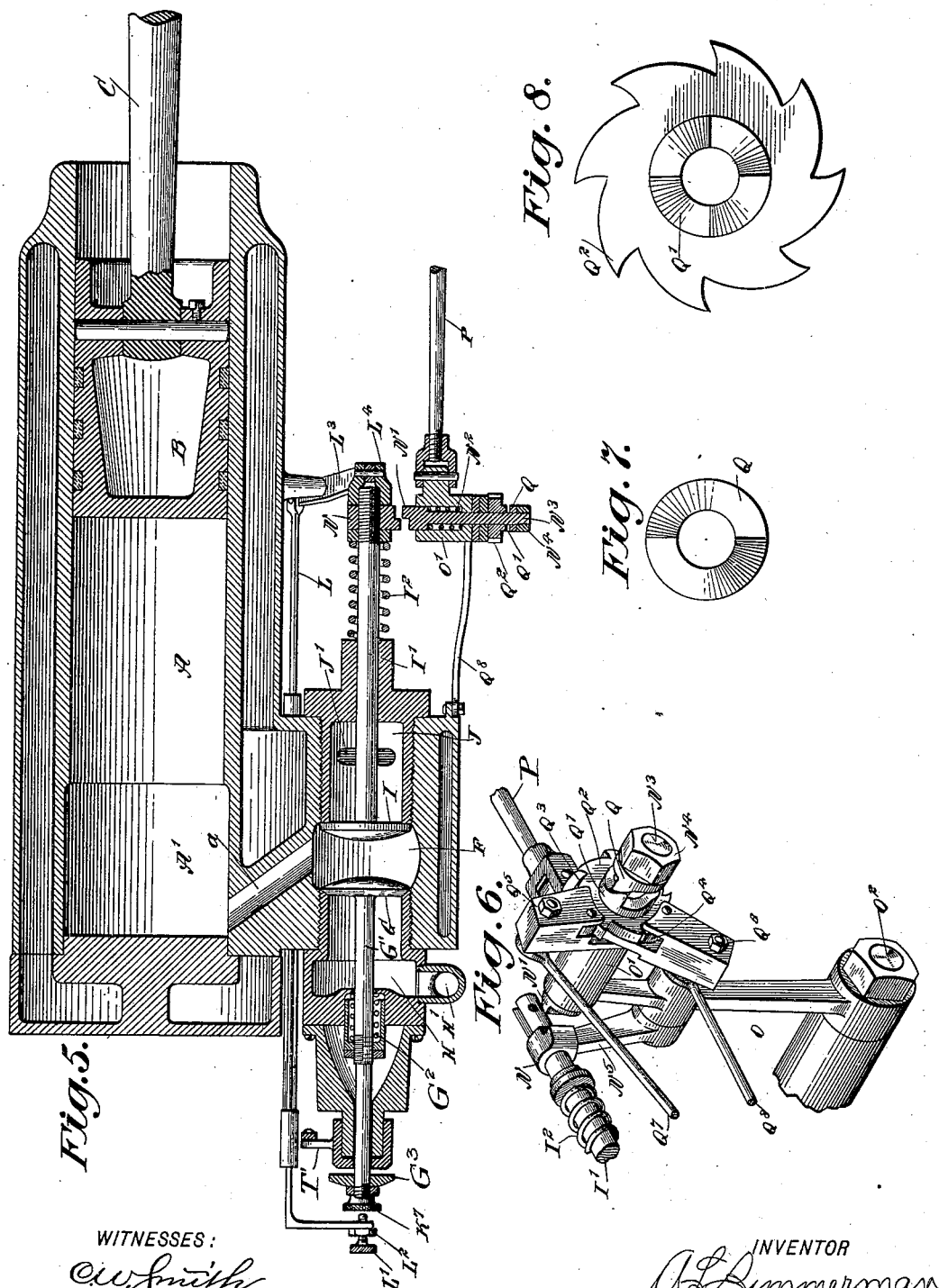

UNITED STATES PATENT OFFICE.

ALBERT L. ZIMMERMAN, OF VALPARAISO, INDIANA, ASSIGNOR OF ONE-HALF TO JOHN W. CAMERON, OF SAME PLACE.

SPEED-REGULATOR FOR EXPLOSIVE-ENGINES.

SPECIFICATION forming part of Letters Patent No. 665,714, dated January 8, 1901.

Application filed July 29, 1899. Serial No. 725,490. (No model.)

*To all whom it may concern:*

Be it known that I, ALBERT L. ZIMMERMAN, of Valparaiso, in the county of Porter and State of Indiana, have invented a new and Improved Gas or Gasolene Engine, of which the following is a full, clear, and exact description.

The invention relates to engines receiving an impulse from an explosion every other stroke; and the object of the invention is to provide a new and improved gas or gasolene engine which is simple and durable in construction, arranged to obtain explosions regularly, but of various strength or power, according to the speed of the engine, to insure uniform running thereof under a varying load.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1 is a side elevation of the improvement. Fig. 2 is an end view of the same. Fig. 3 is an enlarged rear sectional elevation of the air-admission valve and the oil-pump, the section being on the line 3 3 in Fig. 2. Fig. 4 is an enlarged rear perspective view of the mechanism for actuating the air-inlet valve and the oil-pump. Fig. 5 is an enlarged sectional plan view of the improvement on the line 5 5 in Fig. 1. Fig. 6 is an enlarged perspective view of the valve and pump actuating device. Fig. 7 is an enlarged face view of one clutch member of said device, and Fig. 8 is a like view of the other clutch member and its actuating ratchet-wheel.

The improved engine is provided with a water-jacketed cylinder A, in which reciprocates a piston B, connected at the inner or open end of the cylinder by a pitman C with a crank D' on the main driving-shaft D, provided with the usual fly-wheels E and a pulley E' for transmitting the rotary motion of the shaft to other machinery. The outer or closed end of the cylinder A is formed with a working or explosion chamber A' (see Fig. 5) and connected by a port $a$ with chest F, connected at one side by a mixture-inlet valve G with a mixing-chamber H and at the other side by an exhaust-valve I with an exhaust-chamber J, provided with an outlet or exhaust pipe J' for carrying off the products of combustion. Into the mixing-chamber H opens an air-supply pipe H', connected with the outer air, and said chamber also connects by a port $b$ with the discharge-chamber K' of a pump K. (See Fig. 3.) The pump K is actuated from the main driving-shaft D, in conjunction with the exhaust-valve I, and the mixture-inlet valve G is opened by the suction action of the piston B in the cylinder A when on the inward stroke; but the length of the pump-stroke and the opening distance for the inlet-valve G are controlled by the governor, as hereinafter more fully described.

In order to actuate the pump from the main driving-shaft, I provide the following detail construction, special reference being had to Figs. 3, 5, and 6: The pump K is provided with a barrel $K^2$, in which reciprocates a plunger $K^3$, normally held in an outermost position by a spring $K^4$, as indicated in Fig. 3. Into the barrel $K^2$ opens the valved gravity oil-feed pipe $K^5$, and said barrel is connected by a spring-pressed valve $K^6$ with the valve-discharge chamber K', so that on the inward stroke of the plunger $K^3$ against the tension of the spring $K^4$ the previously-drawn-in oil or gasolene is forced past the valve $K^6$ into the chamber K' and from the latter through the port $b$ into the mixing-chamber H to mix therein with the air passing in by the pipe H'. On the return or outward stroke of the plunger $K^3$ by the action of the spring $K^4$ oil flows through the gravity feed-pipe $K^5$ into the barrel $K^2$ to fill the same, the valve in the pipe $K^5$ closing on the next inward or working stroke of the plunger $K^3$.

The outer end $K^7$ of the plunger $K^3$ is adapted to be engaged by a set-screw L', held in the end of a slidable rod L, mounted to slide longitudinally in suitable bearings arranged on the engine-frame, the set-screw being secured in place after adjustment by the jam-nut $L^2$, as is plainly indicated in the drawings. The rod L is connected with a lever $L^3$, (see Fig.

5,) fulcrumed on the engine and pivotally connected with a head L⁴, secured on the outer end of the stem I' of the exhaust-valve I, said stem being pressed on by a spring I² to normally hold the valve I in a closed position and the set-screw L' from the end K⁷ of the plunger K³.

On the stem I' of the valve I, adjacent to the head L⁴, is secured a shouldered collar N, adapted to be engaged by a slide N', mounted to slide transversely in the upper end O' of a lever O, fulcrumed at its lower end O² to the frame of the engine, said upper end O' of the lever O being connected with the eccentric-rod P of an eccentric on the main driving-shaft D to impart a uniform swinging motion to the lever O when the engine is running. Normally the slide N' stands out of contact with the collar N, and consequently the stem I', with its valve I, is held by the spring I² in an outermost closed position; but when the slide N' is moved transversely at every second revolution of the shaft D then said slide engages the collar N and imparts a sliding motion to the stem I' against the tension of the spring I² to move the valve I off its seat and connect the chest F with the exhaust-chamber J to allow the products of combustion to escape from the cylinder during the second return or outward stroke of the piston B, as hereinafter more fully explained.

The slide N' is pressed on by a spring N² in the end O', (see Fig. 5,) and on the outer end of the shank N³ of said slide are secured a nut N⁴ and a cam or clutch member Q, having two teeth adapted to be engaged by four teeth in a cam or clutch member Q', formed or attached to a ratchet-wheel Q², mounted to rotate loosely on the shank N³ of the slide N'. The ratchet-wheel Q² is engaged at diametrically opposite points by pawls Q³ Q⁴, fulcrumed on arms Q⁵ Q⁶, respectively, mounted to swing loosely on the shank N³ as a fulcrum, said arms being pivotally connected at their free ends with links Q⁷ Q⁸, respectively, pivoted on the stationary chest F, as shown in Figs. 1 and 5.

Now when a rocking motion is given to the lever O from the eccentric then the slide N' is carried bodily forward and backward in the upper end of the lever, and the links Q⁷ Q⁸ impart a rocking motion to the arms Q⁵ Q⁶, so that the pawls Q³ Q⁴ thereof impart an intermittent rotary motion to the ratchet-wheel Q², whereby the clutch member Q' actuates the clutch member Q on every other revolution to allow a transverse sliding of the slide N' in the end O' by the action of the spring N² to engage the slide N' with the collar N and to impart a sliding motion to the stem I' to open the valve I, as above explained, and to also impart a swinging motion to the lever L³ to move the rod L inward, so that the set-screw L' moves in engagement with the plunger K³ and causes the latter to force a charge into the mixing-chamber H, as above explained. The collar N above referred to is attached to an arm N⁵, loosely fulcrumed on the lever O, as shown in Fig. 6. As shown in the drawings, the ratchet-wheel Q² has eight teeth, and the throw of the eccentric is such that the ratchet-wheel is turned at each revolution of the shaft D the distance between two teeth, and as the cam or clutch members Q Q' have two and four teeth, respectively, it is evident that the engine-shaft has to make one and one-half revolutions before the clutch member Q registers with the member Q' and slides transversely thereto. During the following one-half revolution of the shaft D the position of the clutch member Q is not disturbed, and consequently the valve remains open during this period to allow escape of the products of combustion from the cylinder.

The valve G is provided with a valve-stem G', pressed on by a spring G² to normally hold the valve G to its seat, but to allow the valve to open during the suction period—that is, when the piston B is on the inward stroke. It is evident that when this takes place the previously-forced-in oil from the pump K mixes with the air drawn in by the pipe H', and this mixture passes from the chamber H into the chest F and to and by the port a into the cylinder to be compressed on the return or next outward stroke of the piston B and to be then ignited by a suitable electric or other igniting device. The explosion then following gives an impulse to the piston B to force the same on its next inward stroke, the valves G and I then remaining closed owing to the pressure in the chest F. On the next outward stroke of the piston B the valve I opens, as above explained, to allow the products of combustion to be discharged from the cylinder by way of the port a, chest F, chamber J, and pipe J'.

In order to control the length of the stroke of the plunger K³ of the pump at the time the valve G is opened for admitting a mixture to the cylinder, I provide the following arrangement, it being expressly understood that the governor, according to the speed of the engine, controls this arrangement, special reference being had to Figs. 1 and 4

On the stem of the governor R of any approved construction is held a rod R', pivotally connected at its lower end with a link R², connected with the arms T' and U' of a cam-sleeve T and a screw-rod U, respectively. (See Fig. 4.) The sleeve T is formed in its periphery with spiral slots T², into each of which projects a pin T³, held on a fixed bearing T⁴, on which the sleeve is mounted to turn and to slide longitudinally. The sleeve T and its bearing T⁴ are concentric with the valve-stem G' of the inlet-valve G, and the said sleeve forms a limiting-stop for the collar G³, secured on the outer end of the stem G', the distance between the sleeve and the collar corresponding to the opening movement of the valve G during the suction period. When the speed of the engine increases, the rod R' is drawn upward by the action of the governor, and an upward motion is thereby given to the arm T' by the link R², so that the cam-sleeve T is turned and moved outward by the action of the pins T³ in the grooves T². Thus the outer end of the sleeve T is moved nearer to the collar G³, so that during the next suction period the inward opening of the valve G is reduced, and consequently a less amount of explosive mixture is allowed to pass into the cylinder to cause a reduction of speed. The screw-rod U is made hollow and mounted to turn loosely on the end K⁷ of the pump-plunger K³, and said screw-rod screws in a nut U², fixed to suitable arms U³, forming part of the engine. The inner end of the screw-rod U is adapted to be engaged by a shoulder K⁸ on the plunger K³ to limit the inward-sliding motion of said plunger.

Now it is evident that when the screw-rod U is turned by the action of the governor the stroke of the plunger K³ is lengthened or shortened, according to the direction in which the screw-rod is turned, so that more or less oil or gasolene is forced by the plunger into the mixing-chamber H. As the governor actuates both graduating devices, the one for the valve G and the other for the pump, it is evident that a more or less strong mixture is formed in the chamber H, and more or less of this mixture is passed into the cylinder to give a more or less forcible impulse to the piston, according to the speed of the engine.

It is understood that a charge of explosive mixture is passed into the cylinder at every other revolution of the main shaft, and this charge is ignited to give an impulse to the piston, as described; but as the charge is rarefied according to the speed of the engine it is evident that the explosions take place regularly, but with more or less force, according to the speed.

Having thus fully described my invention, I claim as new and desire to secure by Letters Patent—

1. An explosion-engine, comprising a cylinder, a piston reciprocating therein, a chest in communication with said cylinder, a mixing-chamber, an inlet-valve for connecting the mixing-chamber with said chest, an air-supply for the mixing-chamber, a pump for pumping the gas or oil into the mixing-chamber, graduating devices for the said inlet-valve and said pump, to limit the opening movement of the said inlet-valve and the stroke of said pump, the graduating device for the valve consisting of a sleeve turned by the action of the governor and provided with a spiral groove, a fixed pin extending into the groove, a collar on the valve-stem to abut against the said sleeve, the said graduating device for the pump consisting of a screw-rod for the pump-plunger to abut against and turned by the action of the governor, and a fixed nut in which screws the screw-rod, substantially as shown and described.

2. An explosion-engine, comprising a cylinder, a piston reciprocating therein, a chest in communication with said cylinder, a mixing-chamber, an inlet-valve for connecting the mixing-chamber with said chest, an air-supply for the mixing-chamber, a pump for pumping the gas or oil into the mixing-chamber, graduating devices for the said inlet-valve and said pump, to limit the opening movement of the said inlet-valve and the stroke of said pump, the graduating device for the valve consisting of a sleeve turned by the action of the governor and provided with a spiral groove, a fixed pin extending into the groove, a collar on the valve-stem to abut against the said sleeve, the said graduating device for the pump consisting of a screw-rod for the pump-plunger to abut against and turned by the action of the governor, a fixed nut in which screws the screw-rod, a governor, a rod connected with the governor and raised or lowered by the same according to the speed of the engine, a link on the said rod, and arms on the said sleeve and the said screw-rod, and connected with the said link, substantially as shown and described.

3. An explosion-engine, provided with a pump comprising a barrel, a spring-pressed plunger in said barrel, an inlet-pipe for said barrel, a discharge-chamber connected with the barrel and means for moving the plunger against the tension of the spring the said means comprising a rod mounted to slide in bearings on the engine-frame, a set-screw adjustably carried by said rod, and adapted to engage the plunger when the rod is moved inward, a lever connected with said rod and adapted when swung to move the said rod inward, a spring-pressed slide for actuating said lever, and a lever receiving a rocking motion from the engine-shaft, and carrying said slide, substantially as described.

4. An explosion-engine, provided with a cylinder, a piston reciprocating therein, a chest in connection with the working chamber of the cylinder, an exhaust-chamber connected with the chest, a spring-pressed exhaust-valve controlling the connection between the said chest and the said exhaust-chamber, the valve being normally held to its seat by its spring, an actuating device for the said valve, and comprising a lever receiving a rocking motion from the engine-shaft, a spring-pressed slide mounted in the said lever for engaging the stem of the said valve to move the latter into an open position, a revoluble clutch member mounted to turn on the said slide, and a clutch member fixed on the slide and having less teeth than the revoluble clutch member and adapted to be engaged by the revoluble clutch member, to allow of shifting the slide by its spring for engagement with the valve-stem, substantially as shown and described.

5. An explosion-engine, provided with a cylinder, a piston reciprocating therein, a chest in connection with the working chamber of the cylinder, an exhaust-chamber connected with the chest, a spring-pressed exhaust-valve controlling the connection between the said chest and the said exhaust-chamber, the valve being normally held to its seat by its spring, an actuating device for the said valve, and comprising a lever receiving a rocking motion from the engine-shaft, a spring-pressed slide mounted in the said lever for engaging the stem of the said valve to move the latter into an open position, a revoluble clutch member mounted to turn on said slide, a clutch member fixed on the slide and having less teeth than the revoluble clutch member, to allow of shifting the slide by its spring for engagement with the valve-stem, means for turning the said revoluble clutch member on rocking the lever, and consisting of a ratchet-wheel on the said revoluble clutch member, pawls engaging the ratchet-wheel, arms loosely fulcrumed on the slide, and links pivoted at one end on fixed supports and pivotally connected at their other ends with the said arms, substantially as shown and described.

6. An actuating device for a spring-pressed sliding part, such as the pump or the exhaust-valve, and comprising a spring-pressed slide for connection with the part to be moved in one direction, a lever receiving a rocking motion from the engine-shaft and carrying said slide, and means for imparting a sliding movement to the said slide on rocking the lever, substantially as shown and described.

7. An actuating device for a spring-pressed sliding part, such as the pump or exhaust-valve, and comprising a spring-pressed slide for connection with the part to be moved in one direction, a lever receiving a rocking motion from the engine-shaft and carrying said slide, means for imparting a sliding movement to the said slide on rocking the lever, the said means comprising a revoluble clutch member, a clutch member fixed on the slide and having less teeth than the revoluble clutch member, a ratchet-wheel on the revoluble clutch member, pawls in mesh with the ratchet-wheel, arms fulcrumed loosely on the slide and carrying the pawls, and links pivoted at one end on a fixed support and connected at their other ends with said arms.

8. An explosion-engine, comprising a cylinder, a piston reciprocating therein, a chest in communication with said cylinder, a mixing-chamber, an inlet-valve for connecting the mixing-chamber with said chest at one side thereof, an exhaust-chamber connected with the other side of said chest by an exhaust-valve, an air-supply for the mixing-chamber, a pump for pumping the gas or oil into the mixing-chamber, adjustable devices mounted concentric with the stem of said inlet-valve and the plunger of said pump respectively for limiting the opening movement of the inlet-valve for the explosive mixture and the stroke of said pump, and a governor connected with the said devices for adjusting the same, substantially as described.

9. An explosion-engine, comprising a cylinder, a piston reciprocating therein, a chest in communication with said cylinder, a mixing-chamber, an inlet-valve for connecting the mixing-chamber with said chest, an air-supply for the mixing-chamber, a pump for pumping the gas or oil into the mixing-chamber, adjustable stops mounted to turn concentric with the stem of said inlet-valve and the plunger of the pump respectively and means for imparting longitudinal movement to the said stops when turned to limit the opening movement of said inlet-valve and the stroke of said pump, substantially as described.

10. An explosion-engine, comprising a cylinder, a piston reciprocating therein, a chest in communication with said cylinder, a mixing-chamber, an inlet-valve for connecting the mixing-chamber with said chest, an air-supply for the mixing-chamber, a pump for pumping the gas or oil into the mixing-chamber, devices mounted concentric with the stem of the inlet-valve and the end of the pump-plunger respectively and adjustable longitudinally thereon, the said devices being adapted to be engaged by stops on the said valve-stem and plunger, and a governor connected with said devices for simultaneously adjusting the same with reference to said stops to limit the opening movement of said inlet-valve and the stroke of said pump, substantially as shown and described.

11. An explosion-engine, provided with a cylinder, a piston reciprocating therein, a chest in communication with the working chamber of the cylinder, a mixing-chamber, an inlet-valve for connecting the mixing-chamber with said chest, an air-supply for the mixing-chamber, an exhaust-chamber connected with the chest, an exhaust-valve controlling the connection between the said chest and the exhaust-chamber, the valve being normally held to its seat by a spring, a lever receiving a rocking motion from the engine-shaft, a spring-pressed slide mounted in said lever for engaging the stem of the valve to move the latter into an open position, means for imparting a sliding motion to the slide on rocking the lever, a pump for pumping the gas or oil into the mixing-chamber, a spring-pressed plunger for said pump, and means connected with the stem of the exhaust-valve for moving the pump-plunger against the tension of the spring, substantially as described.

12. An explosion-engine, provided with a pump comprising a barrel, a spring-pressed plunger in said barrel, means for moving the plunger against the tension of the spring and comprising a rod mounted to slide longitudinally in bearings on the engine-frame, a set-screw adjustably carried by said rod and adapted to engage the said plunger when the rod is moved inward, a lever connected with said rod to move the same, an exhaust-valve for the engine provided with a stem the said lever being pivotally connected with the outer end of the stem of the exhaust-valve, means for imparting movement to said valve-stem, whereby the exhaust-valve and the pump-plunger are actuated simultaneously, and means for varying the stroke of the pump and actuated from the governor of the engine, substantially as described.

13. In an explosion-engine, a pump for pumping the gas or oil into the engine, and a device for limiting the stroke of the pump, the said device comprising a hollow screw-rod mounted to turn loosely on the pump-plunger, a fixed nut in which screws the said screw-rod, a stop on the plunger to abut against the screw-rod, a governor, and connections between the said governor and the screw-rod for turning the same substantially as described.

14. In an explosion-engine, a mixing-chamber, an air-supply for the mixing-chamber, a pump for pumping the gas or oil into the mixing-chamber, an inlet-valve for the explosive mixture, a cam-sleeve mounted to turn and arranged concentric with the stem of the inlet-valve and adapted to be engaged by a stop on said valve-stem, the said cam-sleeve when turned being arranged to move longitudinally on its bearings, a governor, and means for turning the said sleeve from the governor substantially as described.

15. An explosion-engine, comprising a cylinder, a piston reciprocating therein, a chest in communication with said cylinder, a mixing-chamber, an inlet-valve for the explosive mixture for connecting the mixing-chamber with said chest, a spring for normally holding the valve to its seat, the said valve being opened by the suction action of the piston when on the inward stroke, an air-supply for the mixing-chamber, a pump for pumping the gas or oil into the mixing-chamber, an exhaust-valve for connecting said chest with the exhaust, the said valve being normally held to its seat by a spring, means for actuating the exhaust-valve and the pump-plunger simultaneously, and devices actuated from the governor for controlling the stroke of the pump and the opening movement of the inlet-valve for the explosive mixture, whereby explosions are obtained regularly but of varying degrees of power, according to the speed of the engine, substantially as described.

ALBERT L. ZIMMERMAN.

Witnesses:
 TERRY BILLINGS,
 MYRON J. DRAPIER.